(12) United States Patent
Sekino et al.

(10) Patent No.: US 8,744,030 B2
(45) Date of Patent: Jun. 3, 2014

(54) DATA TRANSMISSION SYSTEM, DATA TRANSMISSION METHOD, AND TRANSMISSION DEVICE

(71) Applicant: Fujitsu Limited, Kawasaki (JP)

(72) Inventors: Yutaka Sekino, Toyohashi (JP);
Hideyuki Negi, Hamamatsu (JP);
Yoshinori Katoh, Toyohashi (JP);
Toshihiro Tomozaki, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/723,772

(22) Filed: Dec. 21, 2012

(65) Prior Publication Data

US 2013/0114746 A1    May 9, 2013

Related U.S. Application Data

(63) Continuation of application No. PCT/JP2010/060890, filed on Jun. 25, 2010.

(51) Int. Cl.
*G06F 11/00* (2006.01)
*H04L 7/00* (2006.01)

(52) U.S. Cl.
USPC ............ 375/362; 375/355; 375/371; 713/503

(58) Field of Classification Search
CPC ... H04L 7/0008; H04L 7/0016; H04L 7/0033; H04L 7/04; H04L 7/08; H04L 25/14; H04B 3/04; H03M 9/00
USPC ......... 375/257, 259, 260, 354, 355, 362, 371; 713/400, 503
See application file for complete search history.

(56) References Cited

U.S. PATENT DOCUMENTS

| | | | |
|---|---|---|---|
| 6,359,815 B1 | 3/2002 | Sato et al. | |
| 7,072,355 B2 * | 7/2006 | Kizer | 370/463 |
| 2001/0056332 A1 | 12/2001 | Abrosimov et al. | |
| 2004/0223566 A1 | 11/2004 | Yamashita | |
| 2007/0050658 A1 | 3/2007 | Kuwata | |
| 2009/0249152 A1 * | 10/2009 | Higeta et al. | 714/748 |

FOREIGN PATENT DOCUMENTS

| | | |
|---|---|---|
| JP | 4-162840 | 6/1992 |
| JP | 05-110550 | 4/1993 |
| JP | 10-164037 | 6/1998 |
| JP | 2004-501554 | 1/2004 |

(Continued)

OTHER PUBLICATIONS

PCT Written Opinion of the International Searching Authority (Form PCT/ISA/237) in corresponding PCT Application PCT/JP2010/060890, mailed Sep. 28, 2010 (3 pages) (3 pages English Translation).

(Continued)

*Primary Examiner* — David B. Lugo
(74) *Attorney, Agent, or Firm* — Staas & Halsey LLP

(57) ABSTRACT

A data transmission system includes a plurality of signal lines, a signal line determination unit, and a data transmission unit. The plurality of signal lines transmit data transmitted from a transmission-side device to a reception-side device. The signal line determination unit determines which signal line among the signal lines is used to transmit reception adjustment data to the reception-side device. The data transmission unit uses the signal line determined by the signal line determination unit to transmit the reception adjustment data to the reception-side device and uses another signal line to transmit transmission data to the reception-side device.

9 Claims, 21 Drawing Sheets

(56) References Cited

FOREIGN PATENT DOCUMENTS

| JP | 2004-236019 | 8/2004 |
| JP | 2007-60217 | 3/2007 |
| WO | WO 99/46687 | 9/1999 |

OTHER PUBLICATIONS

PCT International Preliminary Report on Patentability (Form PCT/IB/373) in corresponding PCT Application PCT/JP2010/060890, mailed Dec. 28, 2012 (8 pages).

PCT International Search Report (Form PCT/ISA/210) in corresponding PCT Application PCT/JP2010/060890, mailed Sep. 28, 2010 (3 pages) (2 pages English Translation).

International Search Report of Corresponding PCT Application PCT/JP2010/060890 mailed Sep. 28, 2010.

Written Opinion of the International Searching Authority of Corresponding PCT Application PCT/JP2010/060890.

Japanese Office Action mailed Nov. 5, 2013 in corresponding Japanese Patent Application No. 2012-521252 (1 page) (3 pages English translation).

Japanese Office Action mailed Jan. 28, 2014 in corresponding Japanese Patent Application No. 2012-521252 (1 pages) (1 page English Translation).

\* cited by examiner

※COMMAND CLOCK IS Clock SIGNAL FOR DATA TRANSFER OR
COMMAND DEDICATED SIGNAL

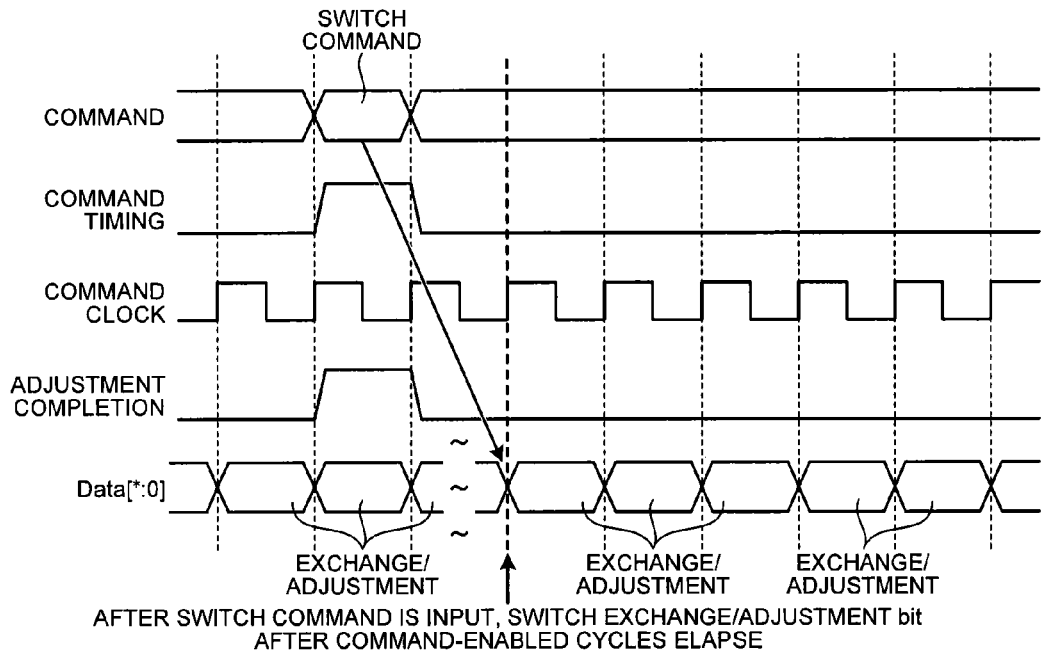
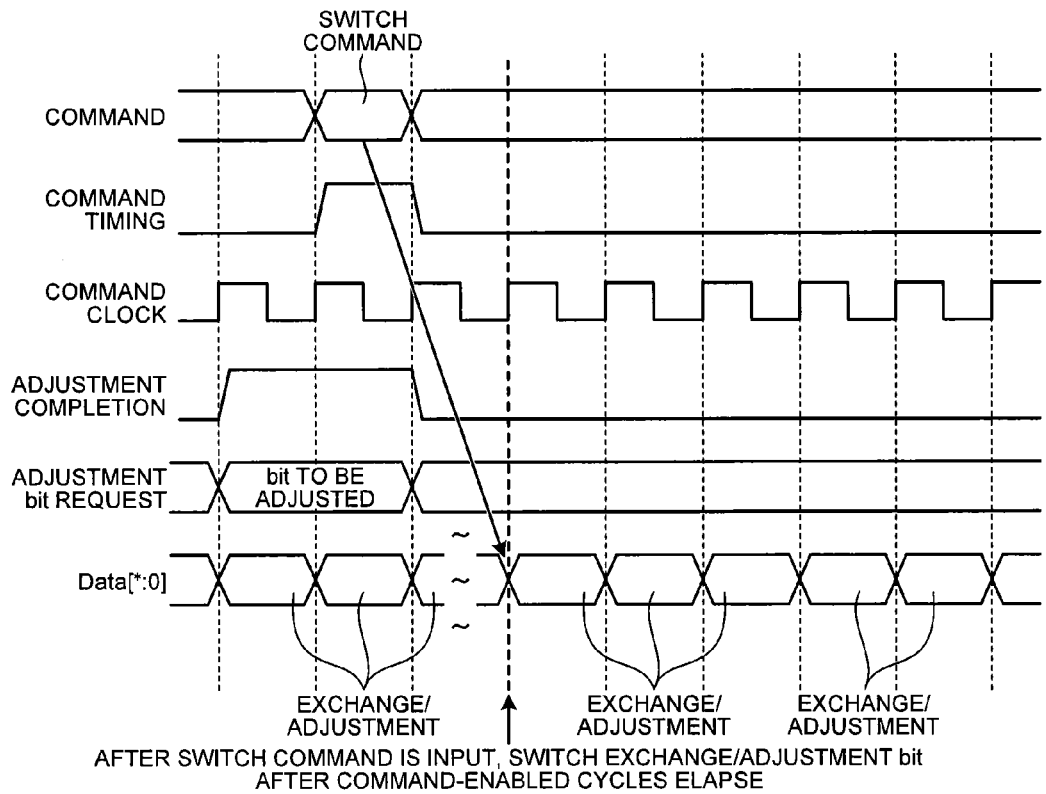

AFTER SWITCH COMMAND IS INPUT, SWITCH EXCHANGE/ADJUSTMENT bit AFTER COMMAND-ENABLED CYCLES ELAPSE AFTER TRANSFER COMMAND IS INPUT, SWITCH EXCHANGE/ADJUSTMENT bit AND RESTART EXCHANGE/ADJUSTMENT AFTER COMMAND-ENABLED CYCLES ELAPSE

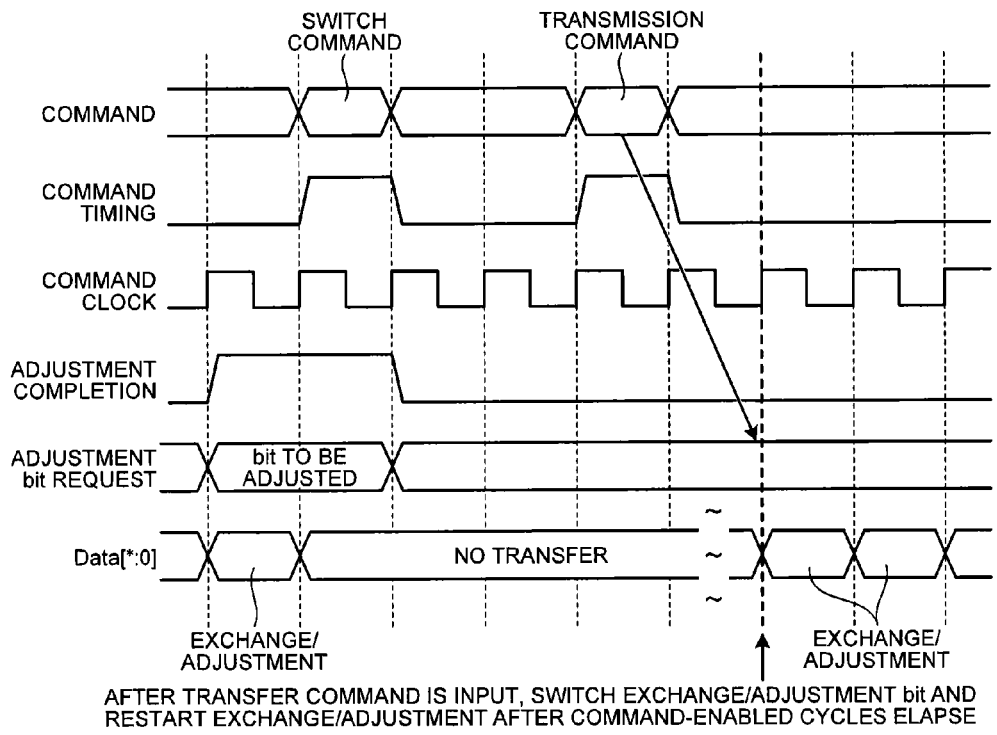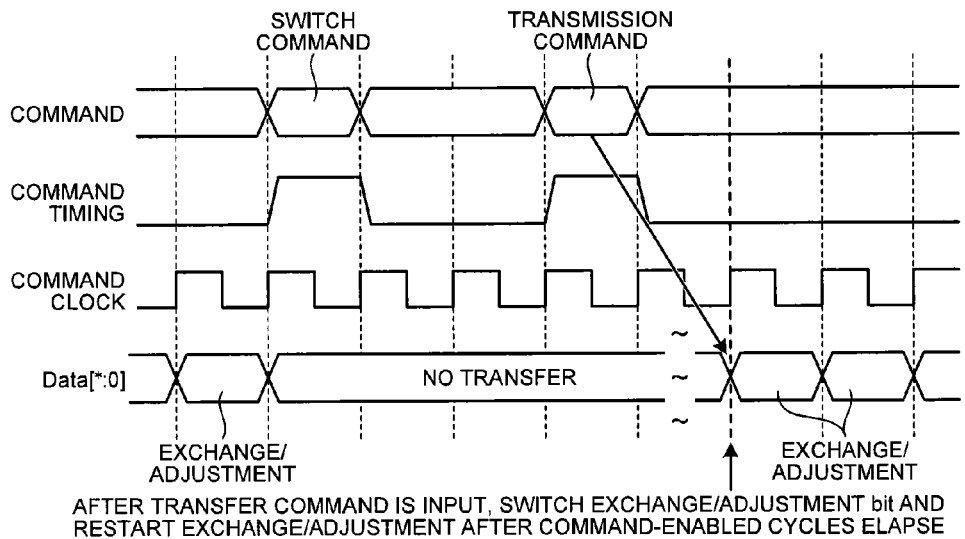

DATA TRANSMISSION SYSTEM, DATA TRANSMISSION METHOD, AND TRANSMISSION DEVICE

CROSS-REFERENCE TO RELATED APPLICATION

This application is a continuation application of International Application PCT/JP2010/060890, filed on Jun. 25, 2010, and designating the U.S., the entire contents of which are incorporated herein by reference.

FIELD

The present invention relates to a data transmission system, a data transmission method and a transmission device.

BACKGROUND

There is conventionally known that when data is transmitted and received between LSIs (Large Scale Integration), the transmission-side LSI transfers data via a data transfer line to the reception-side LSI and the reception-side LSI receives the data.

When data is transmitted and received between such LSIs, a reception timing or impedance of parallel data changes due to a data transmission/reception frequency, reception situation or substrate heat, and reception data may not be correctly received. Thus, the data transmission/reception is interrupted to make a reception adjustment at a constant period in order to keep an optimum reception state in the reception-side LSI. For example, for the reception adjustment, the transmission-side LSI transfers a specific pattern to the reception-side LSI thereby to adjust a reception timing or impedance.

A structure of the transmission-side LSI and the reception-side LSI will be described herein with reference to FIG. 32. As illustrated in FIG. 32, four data transmission signal lines that transmit data are connected between the transmission-side LSI and the reception-side LSI and a clock signal line that transmits a clock indicating a data reception timing is connected therebetween.

The transmission-side LSI includes a transmission data control unit that performs handshaking for data transfer and reception adjustment, a transmission data generation unit that generates transmission data, an adjustment data generation unit that generates adjustment data, and a parallel data transmission unit that transmits the transmission data and the adjustment data. The reception-side LSI includes a reception data control unit that performs handshaking, a reception end that receives data or clocks, a parallel data reception unit that receives data from the reception end in parallel, a reception data use unit that uses reception data, and a reception adjustment unit that makes a reception adjustment from adjustment data.

Data transmission/reception processing and reception adjustment processing in the transmission-side LSI and the reception-side LSI will be described herein with reference to FIG. 33. As illustrated in FIG. 33, the transmission-side LSI and the reception-side LSI start to transfer data when a device power supply is powered ON, and perform initialization between the transmission-side LSI and the reception-side LSI (step S1). Then, data is transmitted and received in a normal mode (step S2).

The reception-side LSI monitors a reception state and determines whether reception adjustment is necessary (step S3). Consequently, when it is determined that reception adjustment is necessary, the data transmission/reception is interrupted to proceed to an adjustment mode (step S4), and when the adjustment is completed (step S5), returns to the normal mode to restart the data transmission/reception.

The processing in the normal mode and the adjustment mode will be specifically described herein. At first, in the normal mode, the transmission-side LSI and the reception-side LSI perform handshaking in order to transfer data, and then the transmission-side LSI transmits data to the reception-side LSI via the data transmission signal lines as illustrated in FIG. 34.

In the adjustment mode, after the data transmission/reception is interrupted, the transmission-side LSI and the reception-side LSI perform handshaking for reception adjustment, and then the transmission-side LSI transmits an adjustment pattern to the reception-side LSI via the data transfer signal lines as illustrated in FIG. 35. Then, the reception-side LSI uses the adjustment pattern to make a reception adjustment. Thereafter, the reception-side LSI finishes the reception adjustment and then returns to the normal mode. In this way, in the data transmission processing between the transmission-side LSI and the reception-side LSI, the normal mode and the adjustment pattern are alternately switched as illustrated in FIG. 36.

Patent Literature 1: Japanese Laid-open Patent Publication No. 04-162840

However, the above method that interrupts data transmission/reception to make a reception adjustment performs data transmission/reception and makes a reception adjustment at different timings, and thus had a problem that a data transmission efficiency lowers. That is, in order to make a reception adjustment, transmission/reception is temporarily interrupted while data is being transmitted and received, and then a reception adjustment is made, and thus a data transmission efficiency lowers.

SUMMARY

According to an aspect of the embodiments, a data transmission system includes: a plurality of signal lines that transmit data transmitted from a transmission-side device to a reception-side device; a signal line determination unit that determines which signal line among the signal lines is used to transmit reception adjustment data to the reception-side device; and a data transmission unit that uses the signal line determined by the signal line determination unit to transmit the reception adjustment data to the reception-side device and uses another signal line to transmit transmission data to the reception-side device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a diagram for explaining adjustment bit determination change waveforms during data transfer;

FIG. 14 is a diagram for explaining the adjustment bit determination change waveforms during data transfer;

FIG. 17 is a diagram for explaining the adjustment bit determination change waveforms during data transfer;

FIG. 18 is a diagram for explaining the adjustment bit determination change waveforms during data transfer;

DESCRIPTION OF EMBODIMENTS

Embodiments of a data transmission system, a data transmission method and a transmission device according to the present invention will be described in detail with reference to the accompanying drawings.

First Embodiment

In the embodiment, a structure and a processing flow of a data transmission system according to the first embodiment will be described, and finally effects of the first embodiment will be described. There will be described below an example in which a bit width of parallel transfer data is 5 bits.

[Structure of Data Transmission System]

Figure 1:
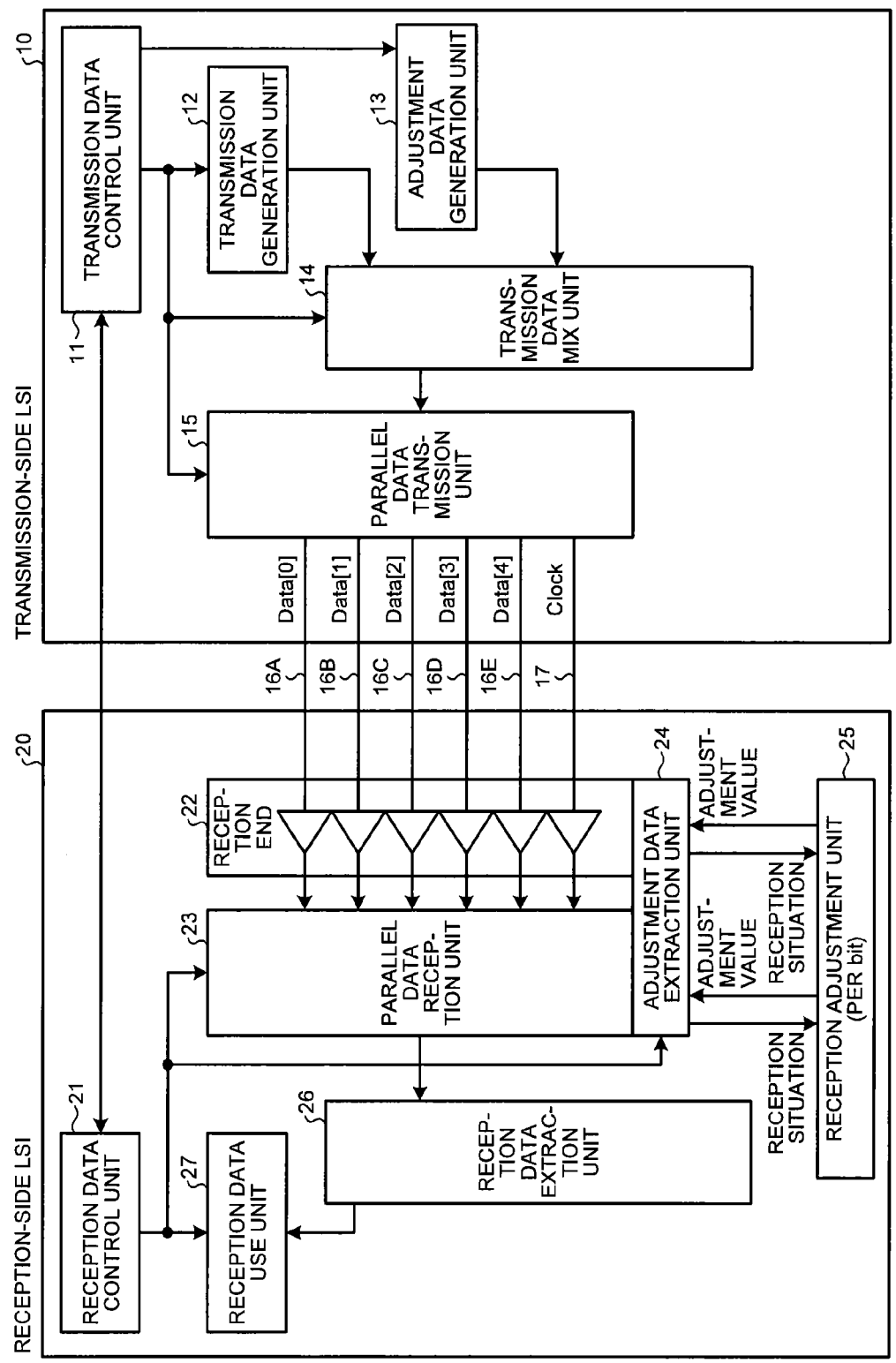
FIG. 1 is a block diagram illustrating a structure of a data transmission system according to a first embodiment.

At first, the structure of the data transmission system according to the embodiment will be described with reference to FIG. 1. FIG. 1 is a block diagram illustrating the structure of the data transmission system according to the first embodiment. A data transmission system 1 illustrated in FIG. 1 includes a transmission-side LSI 10 and a reception-side LSI 20, and the transmission-side LSI 10 and the reception-side LSI 20 are connected to each other via data transmission paths 16A to 16E and a clock transmission path 17.

The data transfer paths 16A to 16E transmit transmission data transmitted from the transmission-side LSI 10 to the reception-side LSI 20 or reception adjustment data for reception adjustment at the reception-side LSI. The clock transmission path 17 transmits a clock indicating a data reception timing.

The transmission-side LSI 10 includes a transmission data control unit 11, a transmission data generation unit 12, an adjustment data generation unit 13, a transmission data mix unit 14 and a parallel data transmission unit 15. The processing of the respective units will be described below.

The transmission data control unit 11 determines which signal line among the signal lines 16A to 16E is used to transmit reception adjustment data to the reception-side LSI. Specifically, the transmission data control unit 11 determines a data transmission path that transmits data and a data transmission path that transmits reception adjustment data for initialization.

Then, the transmission data control unit 11 notifies a start of data transfer and a data transmission path that transmits adjustment data to a reception data control unit 21 in the reception-side LSI 20, and performs handshaking with the reception data control unit 21 in the reception-side LSI 20. The transmission data control unit 11 in the transmission-side LSI 10 and the reception data control unit 21 in the reception-side LSI 20 are connected to each other via the paths that notify an instruction of starting data transfer or a data transmission path that transmits adjustment data.

Figure 2:
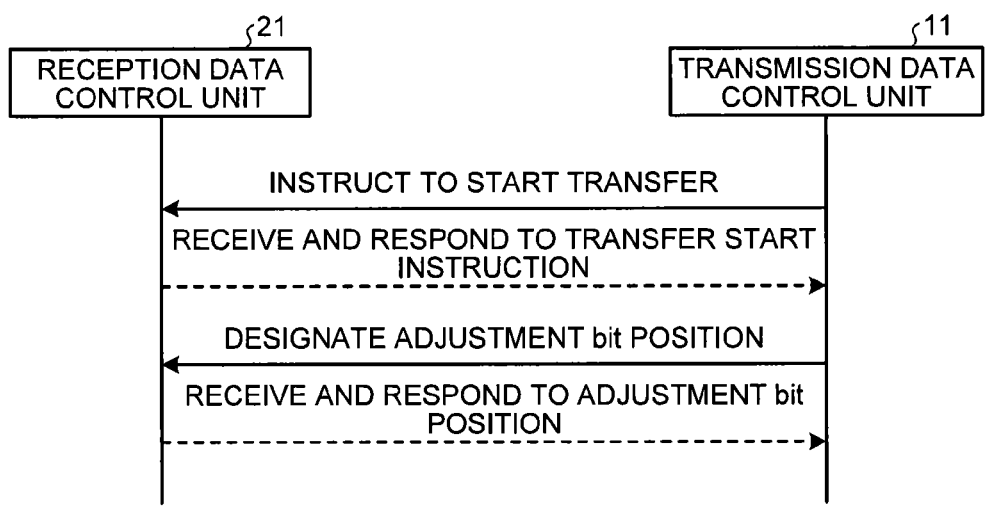
FIG. 2 is a diagram for explaining initialization processing.

For example, as illustrated in FIG. 2, when determining a data transfer bit position indicating a transmission path that transmits data and an adjustment bit position indicating a transmission path that transmits adjustment data, the transmission data control unit 11 transmits an instruction of starting data transfer to the reception data control unit 21 in the reception-side LSI 20. Then, when receiving a response that the instruction of starting transfer has been received from the reception data control unit 21, the transmission data control unit 11 notifies an adjustment bit position to the reception data control unit 21. Thereafter, the transmission data control unit 11 receives a response that the adjustment bit position has been received from the reception data control unit 21.

Figure 3:
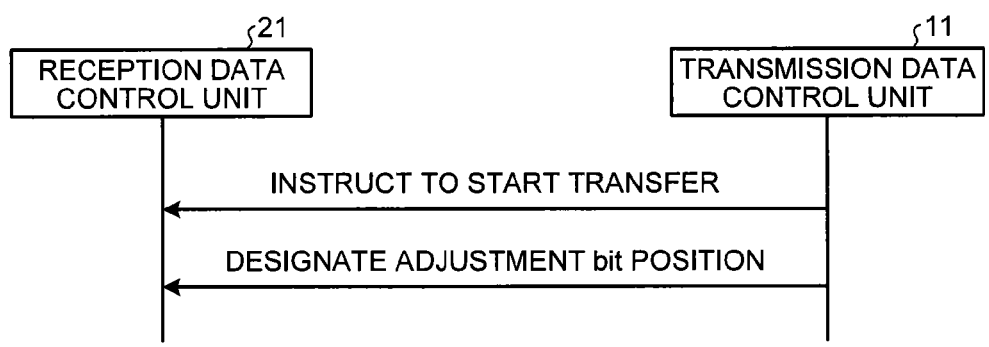
FIG. 3 is a diagram for explaining the initialization processing.
Figure 4:
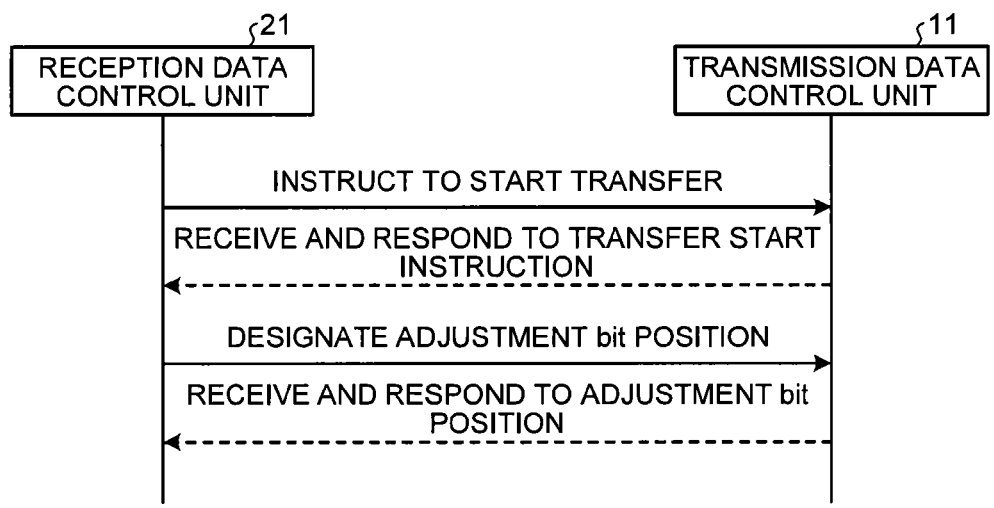
FIG. 4 is a diagram for explaining the initialization processing.

As illustrated in FIG. 3, the response that the instruction of starting transfer has been received and the response that the adjustment bit position has been received does not have to arrive from the reception data control unit 21. As illustrated in FIG. 4, the instruction of starting transfer may be transmitted from the reception data control unit 21 to the transmission data control unit 11, the transmission data control unit 11 may respond to the transfer start instruction from the reception data control unit 21, the reception data control unit 21 may transmit the response that it has received the adjustment bit position to the transmission data control unit 11 in response to the transmission from the transmission data control unit 11, and the transmission data control unit 11 may respond to the reception data control unit.

Figure 5:
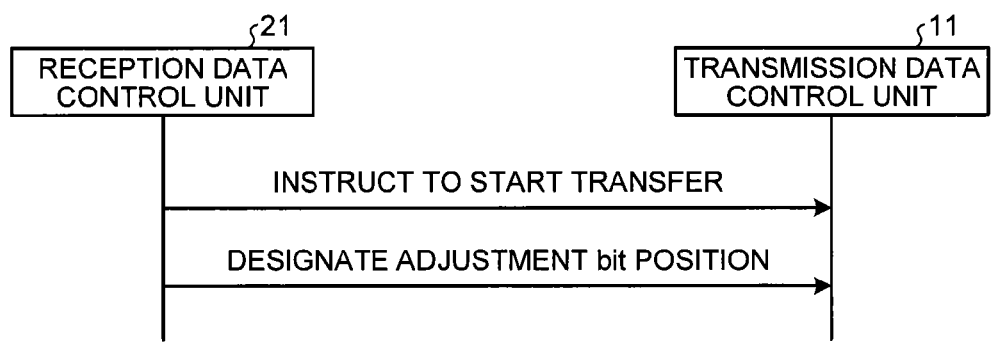
FIG. 5 is a diagram for explaining the initialization processing.

As illustrated in FIG. 5, the instruction of starting transfer and the adjustment bit position are transmitted from the reception data control unit 21 to the transmission data control unit 11, and the transmission data control unit 11 does not have to respond to the reception data control unit 21. In this case, the transmission data control unit 11 prepares transmission according to various contents transmitted from the reception data control unit 21.

Figure 6:
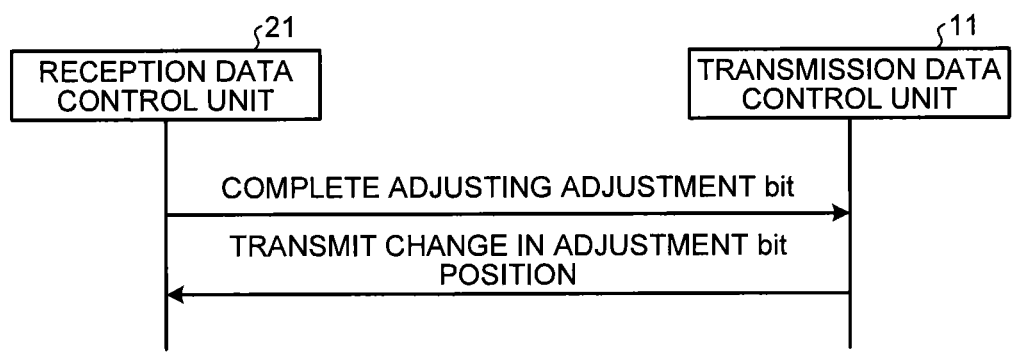
FIG. 6 is a diagram for explaining adjustment bit change processing.

When receiving a status indicating that the reception adjustment of a currently-adjusted data transmission path is completed from the reception data control unit 21, the transmission data control unit 11 notifies a change in data transmission path to be adjusted to the reception data control unit 21. For example, as illustrated in FIG. 6, the transmission data control unit 11 receives a status indicating adjustment completion of the adjustment bit from the reception data control unit 21, and transmits a change in adjustment bit position to the reception data control unit 21.

Figure 7:
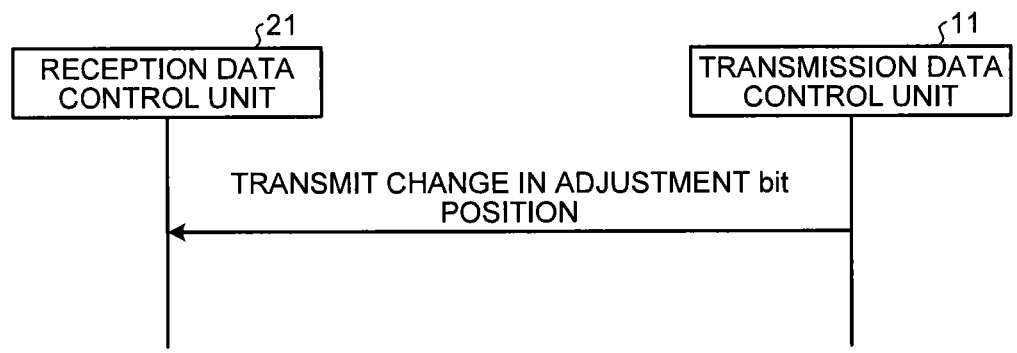
FIG. 7 is a diagram for explaining the adjustment bit change processing.
Figure 8:
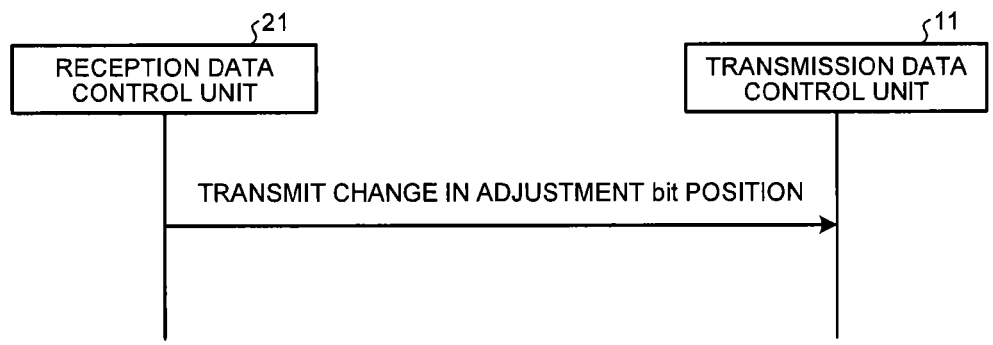
FIG. 8 is a diagram for explaining the adjustment bit change processing.

As illustrated in FIG. 7, the reception data control unit 21 does not have to issue a status indicating adjustment completion of a transmission path and the transmission data control unit 11 may transmit the change in adjustment bit position. When the transmission data control unit 11 transmits the change in adjustment bit position, a determination is made as to whether the transmission data control unit 11 has completed the adjustment, but the bit position is permitted to change even when the reception-side LSI 20 has not completed the adjustment. As illustrated in FIG. 8, the reception data control unit 21 may transmit the change in adjustment bit position.

Figure 9:
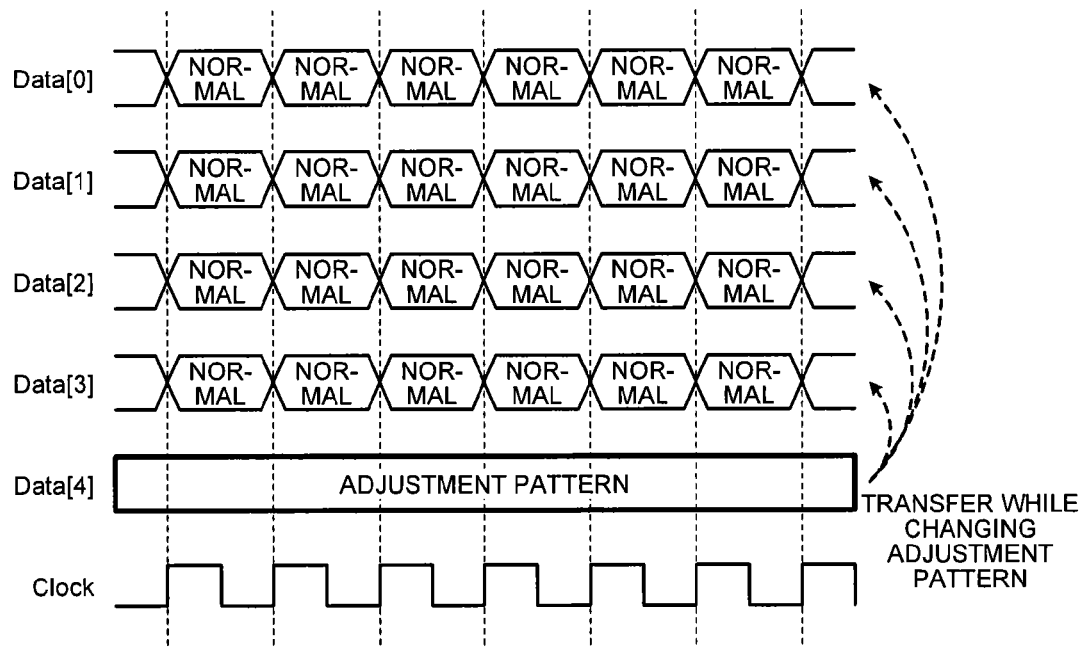
FIG. 9 is a diagram for explaining processing of switching a transmission path that transmits an adjustment pattern.
Figure 10:
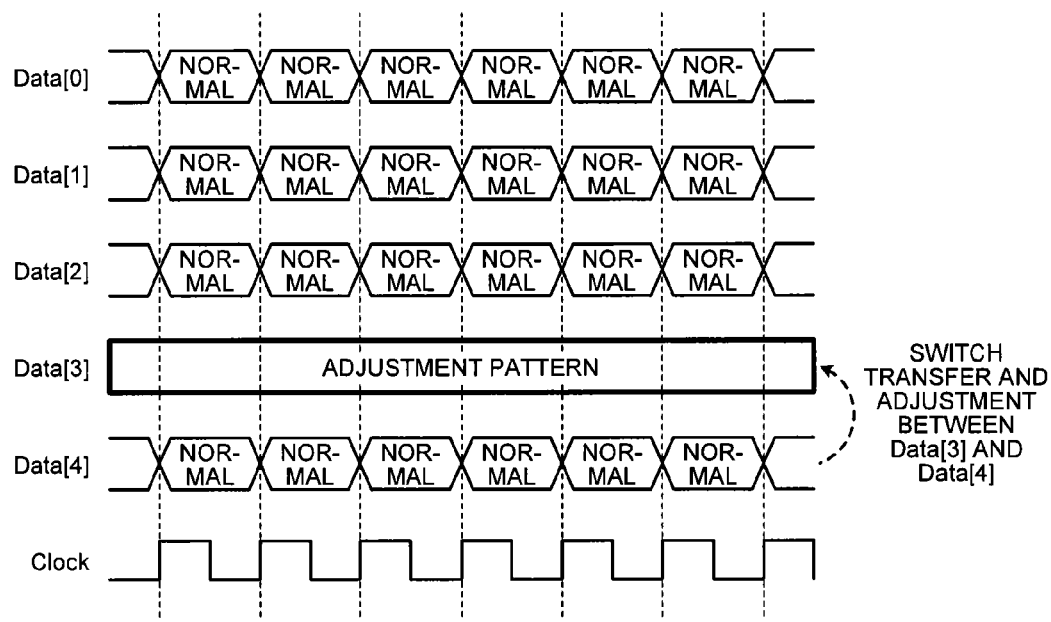
FIG. 10 is a diagram for explaining the processing of switching a transmission path that transmits an adjustment pattern.

In this way, the transmission data control unit 11 switches the transmission path that transmits the adjustment pattern to the reception data control unit 21 according to predetermined conditions. That is, the transmission data control unit 11 changes the adjustment bit position that transmits the adjustment pattern. For example, as illustrated in FIG. 9, the transmission data control unit 11 assigns the adjustment pattern to "Data[4]", assigns normal parallel transmission data to Data [0] to Data[3], and transfers each item of data to the reception data control unit in parallel at a timing of a clock signal Clock. Thereafter, for example, when an error occurs in "Data[3]" as illustrated in FIG. 10, the transmission data control unit 11 assigns the adjustment pattern to "Data[3]" where an error occurs, and assigns the parallel data assigned to Data[3] to "Data[4]."

Figure 11:
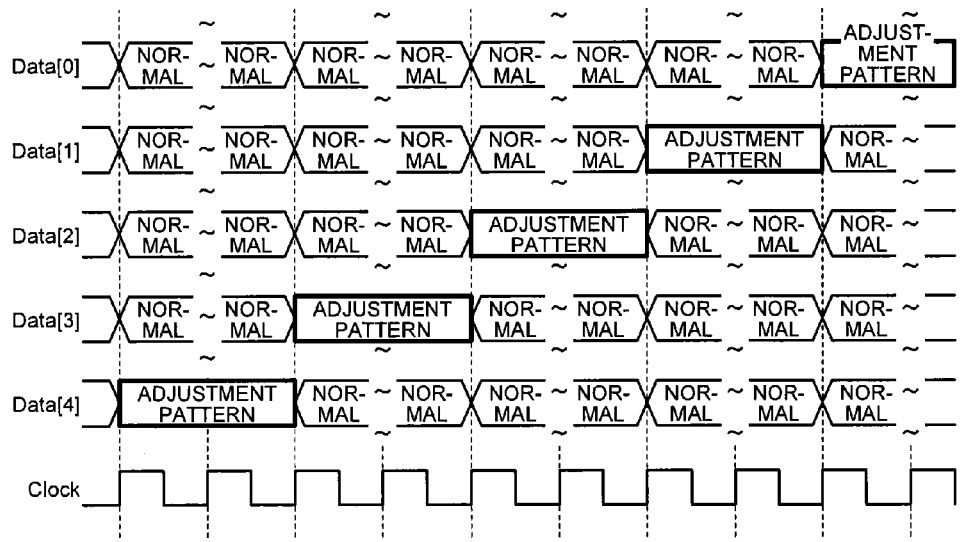
FIG. 11 is a diagram for explaining the processing of switching a transmission path that transmits an adjustment pattern.

The transmission data control unit 11 may sequentially assign the adjustment pattern to any of the data transmission paths 16A to 16E in an order predetermined by a specification or the like. For example, the transmission data control unit 11 may assign the adjustment pattern to "Data[4]", "Data[3]", "Data[2]", "Data[1]" and "Data[0]" in this order as illustrated in FIG. 11. The transmission data control unit 11 may assign the adjustment pattern to the data transmission path which is not adjusted until a predetermined period of time elapses after adjustment.

Figure 12:
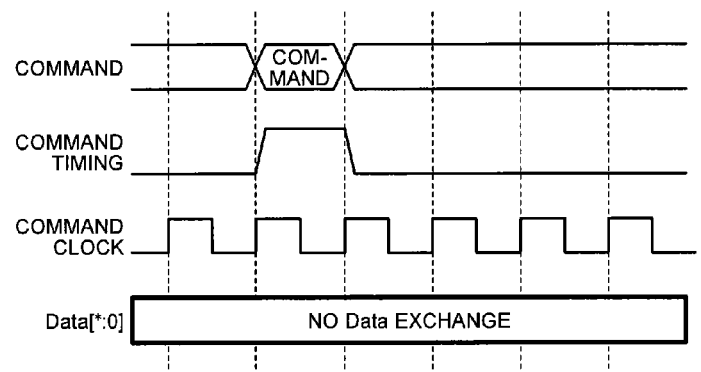
FIG. 12 is a diagram for explaining waveforms when determining an adjustment bit position during initialization.

Waveforms when determining an adjustment bit position during initialization will be described herein with reference to FIG. 12. FIG. 12 is a diagram for explaining the waveforms when determining an adjustment bit position during initialization. As illustrated in FIG. 12, a command timing indicating a command-enabled timing is transmitted from the transmission-side LSI 10 to the reception-side LSI 20, and a command of designating an adjustment bit position is transmitted at a cycle with a command timing of "1" from the transmission-side LSI 10 to the reception-side LSI 20. After the command of designating an adjustment bit position is received by the reception-side LSI 20 to determine an adjustment bit position, data transfer is started. A command clock is transmitted from the transmission-side LSI 10 to the reception-side LSI 20, and a clock signal in the clock transmission path 17 illustrated in FIG. 1 may be utilized or a different clock transmission path from the clock transmission path 17 may be provided to utilize a clock dedicated signal for command. Data is not transmitted and received during initialization.

Adjustment bit determination change waveforms when an adjustment bit position is changed during data transfer will be described herein with reference to FIGS. 13 to 20. FIGS. 13 to 20 are diagrams for explaining the adjustment bit determination change waveforms during data transfer. As illustrated in FIG. 13, when adjustment completion "1" as a status indicating that adjustment of the adjustment bit has been completed is transmitted from the reception data control unit 21 to the transmission data control unit 11, a switch command of switching assignments of a transfer bit and an adjustment bit is transmitted from the transmission data control unit 11 to the reception data control unit 21 via the path that connects the transmission data control unit 11 and the reception data control unit 21. After the switch command is transmitted, the transmission data control unit switches the transfer bit and the adjustment bit to transfer data to the reception data control unit after predetermined cycles. Correspondingly, the reception data control unit 21 switches the transfer bit and the adjustment bit to receive the data after predetermined cycles since reception of the switch command. In FIG. 13, "exchange/adjustment" indicates that each data bit is switched between assignment of transmission data and assignment of adjustment data in parallel data.

A bit which is desired to be assigned to the adjustment bit may be transmitted from the reception data control unit 21 to the transmission data control unit 11. For example, as illustrated in FIG. 14, the adjustment completion "1" as a status indicating that the adjustment of the adjustment bit has been completed is transmitted from the reception data control unit 21 to the transmission data control unit 11 via a transmission path to which the adjustment bit is desired to be assigned. Then, a switch command indicating the assignments of the transfer bit and the adjustment bit is transmitted from the transmission data control unit 11 to the reception data control unit 21. After the switch command is transmitted, the transmission data control unit 11 switches the transfer bit and the adjustment bit and transfers data to the reception data control unit 21 after predetermined cycles. Correspondingly, the reception data control unit 21 controls to switch the transfer bit and the adjustment bit and to receive the data after predetermined cycles since the reception of the switch command.

Figure 15:
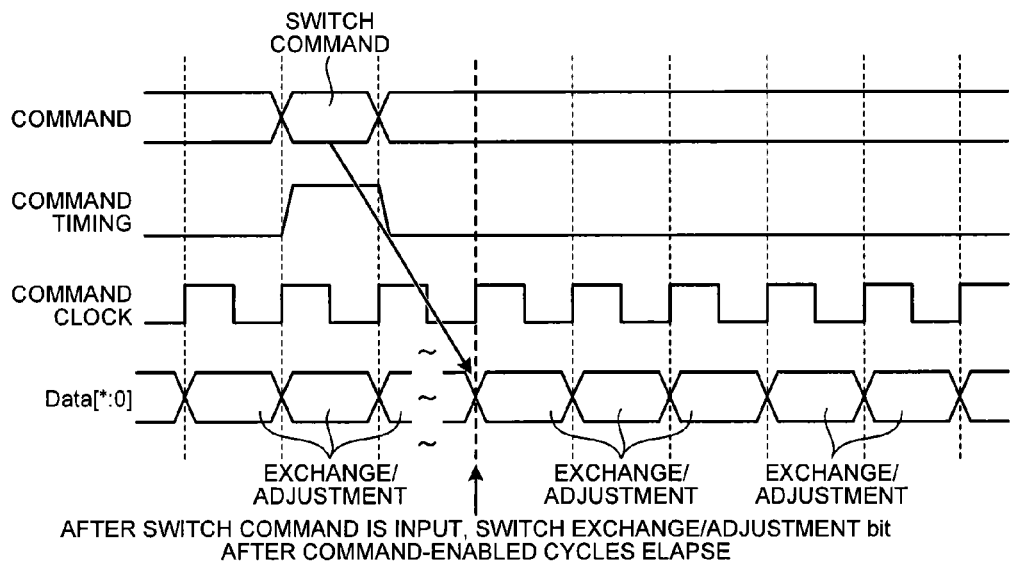
FIG. 15 is a diagram for explaining the adjustment bit determination change waveforms during data transfer.

An adjustment completion response from the reception data control unit 21 is not necessary for transmitting a switch command from the transmission data control unit to the reception data control unit. For example, as illustrated in FIG. 15, the reception data control unit 21 adjusts an adjustment bit (adjusts a reception timing or adjusts an impedance) while receiving data. Then, after the adjustment is completed, a command timing indicating a command-enabled timing is transmitted from the reception data control unit 21 to the transmission data control unit 11, and a switch command of requesting to switch the assignments of the transfer bit and the adjustment bit is transmitted to the transmission data control unit 11 at a cycle with a command timing of "1." Then, after receiving the switch command, the transmission data control unit 11 switches the transfer bit and the adjustment bit after predetermined cycles. Correspondingly, the reception data control unit 21 controls to switch the transfer bit and the adjustment bit and to receive the data after predetermined cycles elapse since the reception of the switch command.

Figure 16:
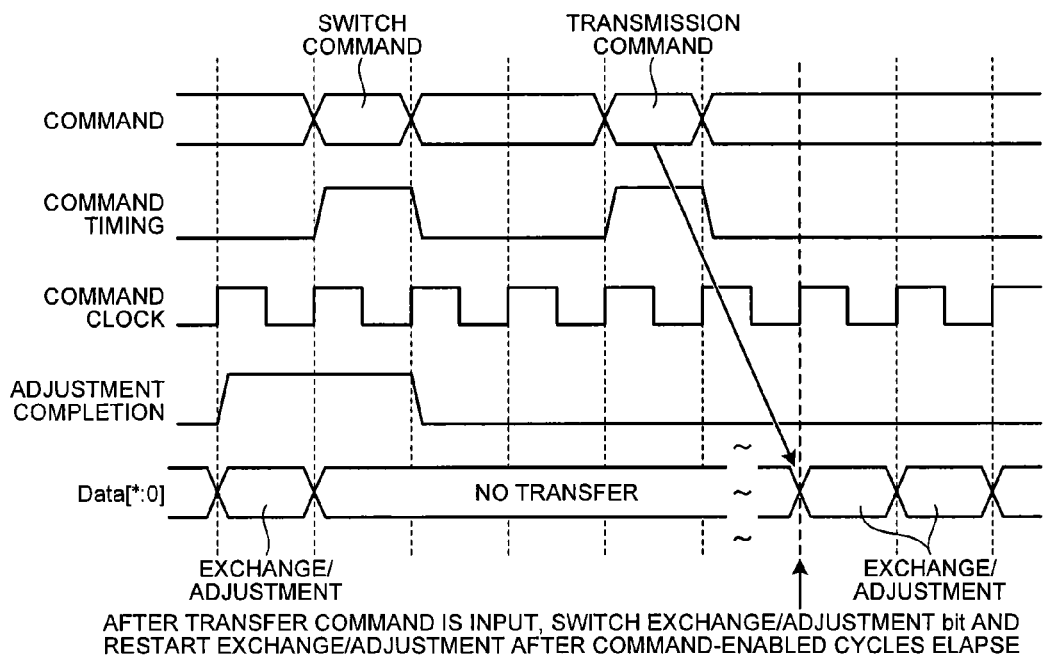
FIG. 16 is a diagram for explaining the adjustment bit determination change waveforms during data transfer.

The adjustment bit may be changed on an interruption of the data transfer. For example, as illustrated in FIG. 16, the reception data control unit 21 transmits the adjustment completion "1" as a status indicating that the adjustment of the adjustment bit has been completed to the transmission data control unit 11. Then, when the data transfer is completed (described as "no transfer" in FIG. 16), the transmission data control unit 11 transmits a switch command of instructing to switch the assignments of the transfer bit and the adjustment bit to the reception data control unit 21. Then, the transmission data control unit 11 transmits a transmission command to the reception data control unit 21, and switches the transfer bit and the adjustment bit to restart the data transmission after the command-enabled cycles elapse since the transmission command is input.

When the adjustment bit is changed at an interruption of the data transfer, a request for the adjustment bit may be made from the reception data control unit 21. For example, as illustrated in FIG. 17, the reception data control unit 21 transmits and notifies a bit which is desired to be assigned to the adjustment bit due to many errors together with the adjustment completion "1" as a status indicating that the adjustment of the adjustment bit has been completed to the transmission data control unit 11 via the path the connects the transmission data control unit 11 and the reception data control unit 21. Thereafter, the transmission data control unit 11 holds the states of the transfer bit and the adjustment bit until the data transfer completes once, and after the data transfer is completed, transmits a switch command of instructing to switch the assignments of the transfer bit and the adjustment bit to the reception data control unit 21. Then, the transmission data control unit 11 transmits a transmission command to the reception data control unit 21, and switches the transfer bit and the adjustment bit and restarts the data transmission after command-enabled cycles elapse since the transmission command is input.

When the adjustment bit is changed at an interruption of the data transfer, an adjustment completion response does not have to be made from the reception data control unit 21. For example, as illustrated in FIG. 18, when the data transfer is completed (described as "no transfer" in FIG. 18) after the adjustment is completed, the reception data control unit 21 transmits a switch command of switching the assignments of the transfer bit and the adjustment bit to the transmission data control unit 11. Thereafter, the transfer bit and the adjustment bit are switched on the start of next transfer. Then, the transmission data control unit 11 transmits the transmission command to the reception data control unit 21, and switches the transfer bit and the adjustment bit and restarts the data transmission after command-enabled cycles elapse since the transmission command is input.

Figure 19:
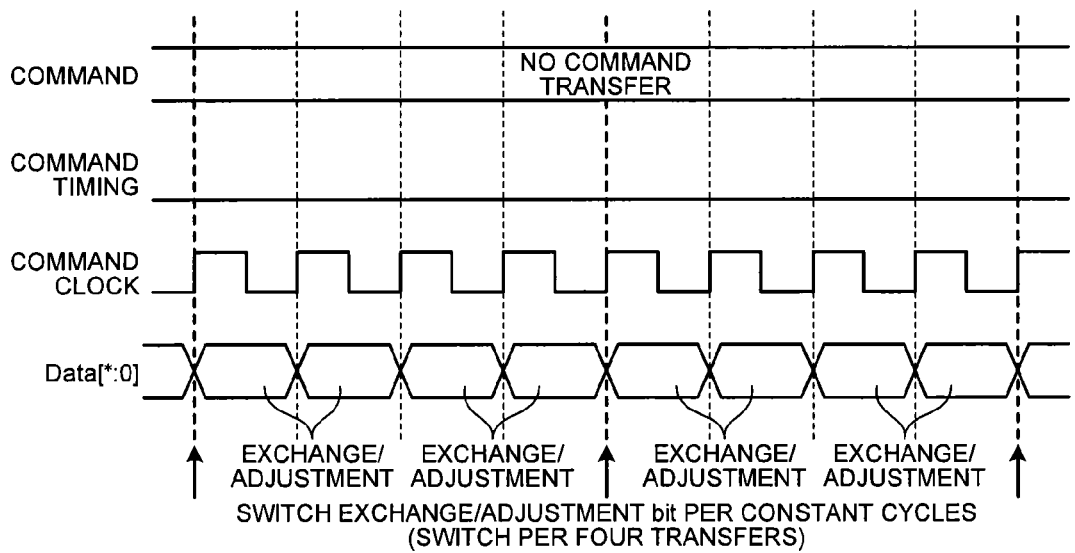
FIG. 19 is a diagram for explaining the adjustment bit determination change waveforms during data transfer.

The adjustment bit may be changed per cycles determined by initialization or the like. For example, as illustrated in FIG. 19, the transmission-side LSI 10 waits for cycles predetermined by initialization or the like from the start of data transfer, and switches the adjustment bit and the transfer bit after the predetermined cycles elapse.

Figure 20:
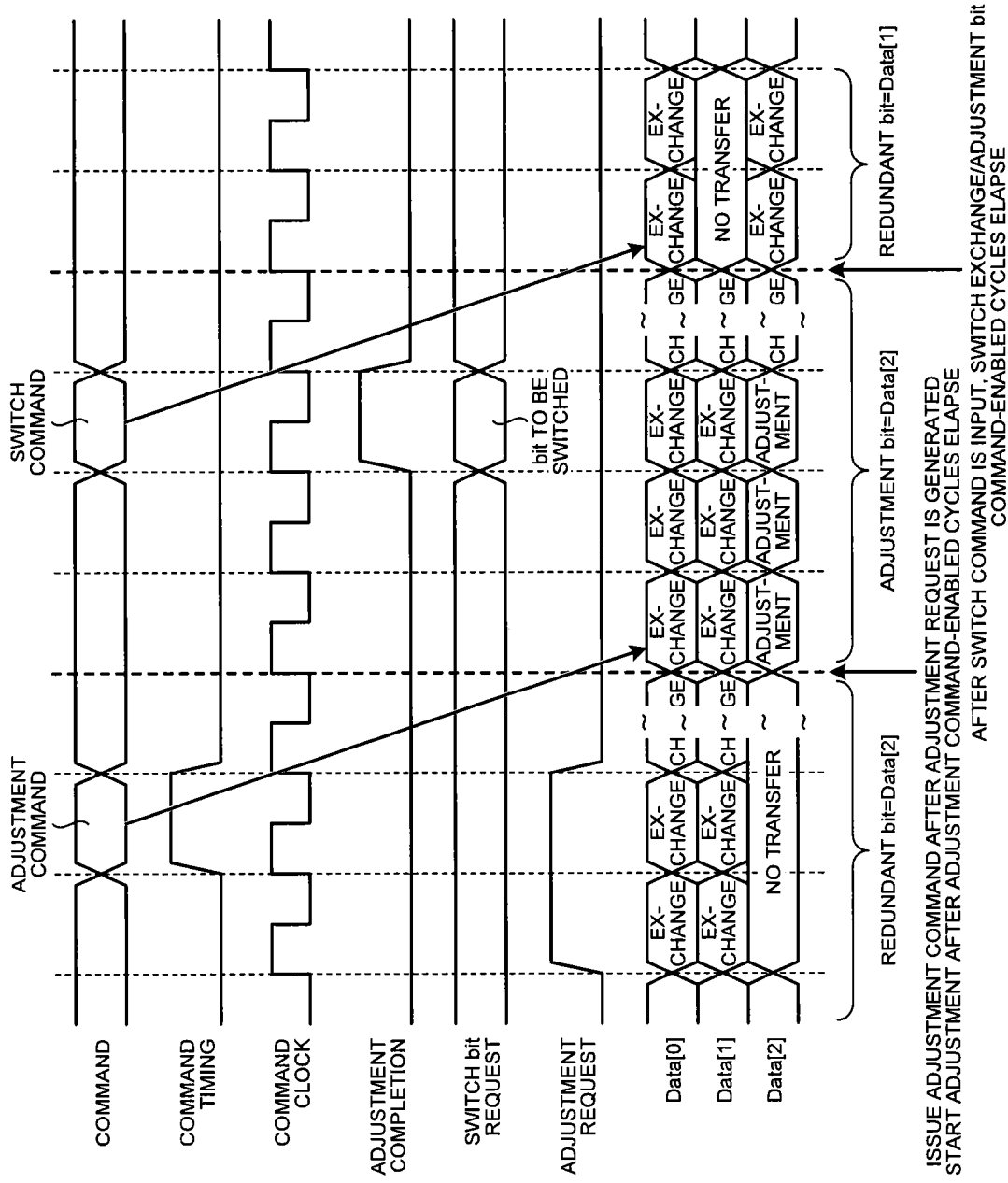
FIG. 20 is a diagram for explaining the adjustment bit determination change waveforms during data transfer.

The reception data control unit 21 checks a communication quality while receiving data, and when detecting a deterioration in communication quality, may transmit, to the transmission data control unit 11, an adjustment request for a redundant bit to which data transmission is not assigned. For example, as illustrated in FIG. 20, the reception data control unit 21 checks a communication quality while receiving data. Then, when detecting a deterioration in communication quality, the reception data control unit 21 transmits an adjustment request of adjusting the redundant bit to the transmission data control unit 11. The transmission data control unit 11 issues an adjustment command to the reception data control unit 21 in response to the adjustment request from the reception data control unit. The transmission data control unit 11 starts to transmit the adjustment data after predetermined cycles via the data transmission path corresponding to the redundant bit.

Subsequently, after completing adjusting the reception timing or impedance, the reception data control unit 21 detects a deterioration in entire communication quality together with the adjustment completion, and checks all the transmission lines. Consequently, a bit which is desired to switch due to a deterioration in communication quality in the data transmission path is transmitted as a switch request signal to the transmission data control unit 11. Thereafter, the transmission data control unit 11 issues a switch command to the reception data control unit 21, and switches the adjustment bit and the transfer bit after predetermined cycles elapse.

Returning to the explanation of FIG. 1, the transmission data generation unit 12 generates transmission data, and notifies the generated transmission data to the transmission data mix unit 14. The adjustment data generation unit 13 generates an adjustment pattern as adjustment data when making an adjustment, and notifies the generated adjustment pattern to the transmission data mix unit 14.

The transmission data mix unit 14 arbitrarily assigns the transmission data and the reception adjustment data to each bit of parallel data, and transfers the assigned data. When the adjustment is not necessary, the adjustment data is not assigned. Specifically, the transmission data mix unit 14 assigns 4-bit normal data and 1-bit adjustment data to any bit of 5-bit parallel data, and notifies them to the parallel data transmission unit 15.

The parallel data transmission unit 15 uses a signal line determined by the transmission data control unit 11 to transmit the reception adjustment data to the reception-side LSI 20, and uses another signal line to transmit the transmission data to the reception-side LSI 20. Specifically, the parallel data transmission unit 15 uses the data transmission path for data transfer and the data transmission path for reception adjustment, which are determined by the transmission data control unit 11, to transmit the transmission data and the adjustment data to the reception-side LSI 20.

The reception-side LSI 20 includes the reception data control unit 21, a reception end 22, a parallel data reception unit 23, an adjustment data extraction unit 24, a reception adjustment unit 25, a reception data extraction unit 26, and a reception data use unit 27. The processing of the respective units will be described below.

The reception data control unit 21 performs initialization for data reception and reception adjustment. Specifically, when receiving the start of data transfer and the data transmission path for adjustment data transmission from the transmission data control unit 11 in the transmission-side LSI 10, the reception data control unit 21 returns a response and performs handshaking with the transmission data control unit 11 in the transmission-side LSI 10. As illustrated in FIGS. 3 to 5, the reception data control unit does not have to return a response to the transmission data control unit, and may transmit the fact that the reception data control unit 21 starts transfer and the data transmission path for adjustment data transmission to the transmission data control unit 11 in the transmission-side LSI 10.

When the adjustment of the transmission path being adjusted is completed, the reception data control unit 21 issues a status indicating the adjustment completion to the transmission data control unit, and receives a command indicating a change in data transmission path for adjustment from the transmission data control unit 11. For example, as illustrated in FIG. 6, the reception data control unit 21 issues a status indicating the adjustment completion of the adjustment bit to the transmission data control unit 11, and receives a change in adjustment bit position from the transmission data control unit 11. As illustrated in FIGS. 7 and 8, the reception data control unit 21 may receive the change in adjustment bit position from the transmission data control unit 11 without issuing a status indicating the adjustment completion of the transmission path, and the reception data control unit 21 may transmit the change in adjustment bit position.

The reception end 22 receives the transmission data and the adjustment data via the data transmission signal lines 16A to 16E, and transfers the received data to the parallel data reception unit 23. The parallel data reception unit 23 makes a reception adjustment to a bit to which the adjustment data is assigned among the parallel data transferred from the reception end 22.

The adjustment data extraction unit 24 extracts the adjustment data from the transmission path of the bit to which the adjustment data is assigned among the parallel data, and notifies the adjustment data to the reception adjustment unit 25. The adjustment data extraction unit 24 notifies a reception situation of the reception end 22 to the reception adjustment unit 25.

Figure 21:
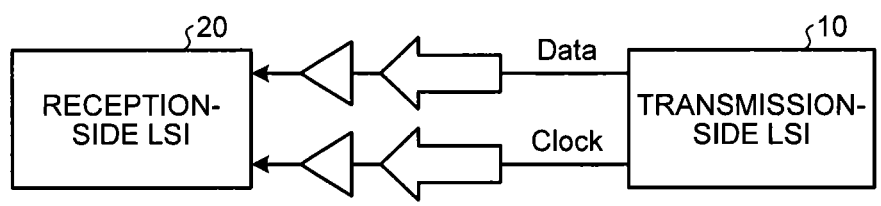
FIG. 21 is a diagram illustrating a flow of data during transmission/reception timing adjustment.

The reception adjustment unit 25 makes a reception adjustment to the parallel data reception device and the reception end. Specifically, the reception adjustment unit 25 adjusts a reception timing or impedance for reception adjustment. An adjustment of a reception timing and an adjustment of an impedance will be specifically described herein with reference to FIGS. 21 to 26. For simplified description, a case in which a clock signal and a data signal are used will be described. As illustrated in FIG. 21, adjustment data and a clock are transmitted from the transmission-side LSI 10 to the reception-side LSI 20 in order to adjust a reception timing. The adjustment data is transmitted from the transmission-side LSI to the reception-side LSI via the signal line for which the reception timing is to be adjusted.

Figure 22:
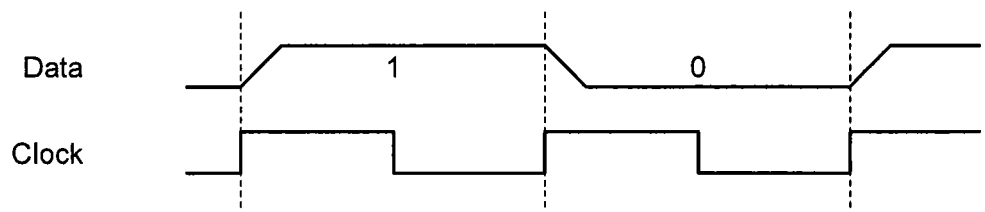
FIG. 22 is a diagram illustrating exemplary transmission end waveforms during timing adjustment.
Figure 23:
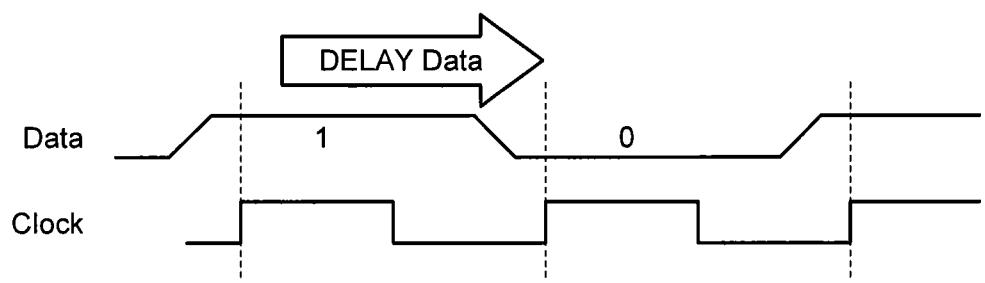
FIG. 23 is a diagram illustrating exemplary reception end waveforms during timing adjustment.

As illustrated in FIG. 22, during timing adjustment, the transmission-side LSI 10 transmits a predetermined pattern signal as adjustment data (illustrated as "Data") to the reception-side LSI 20 in synchronization with the clock. In the example of FIG. 22, a signal for which "1" and "0" are switched per clock cycle is used as the adjustment data. For example, as illustrated in FIG. 23, when the data reaches the reception end 22 in the reception-side LSI 20 earlier than the clock, the reception end 22 delays the data thereby to make a relationship between the clock and the data the same as that in the transmission-side LSI 10. That is, the reception-side LSI 20 makes a reception adjustment to match a rising edge of the clock and a change edge of the data.

Figure 24:
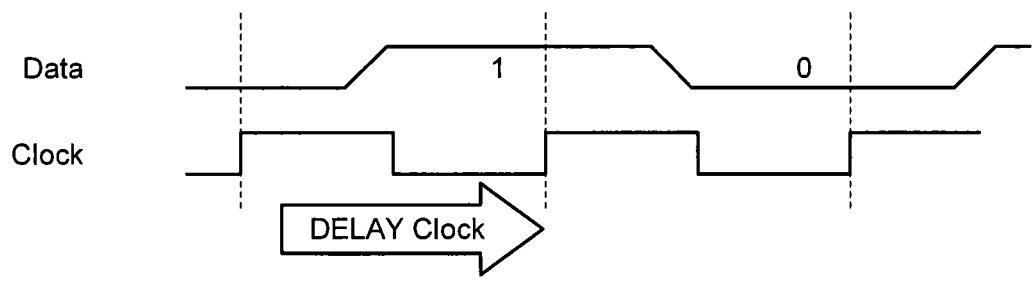
FIG. 24 is a diagram illustrating exemplary reception end waveforms during timing adjustment.

For example, as illustrated in FIG. 24, when the data reaches the reception end 22 in the reception-side LSI 20 later than the clock, the reception end 22 delays the clock thereby to make the relationship between the clock and the data the same as that in the transmission-side LSI 10.

Figure 25:
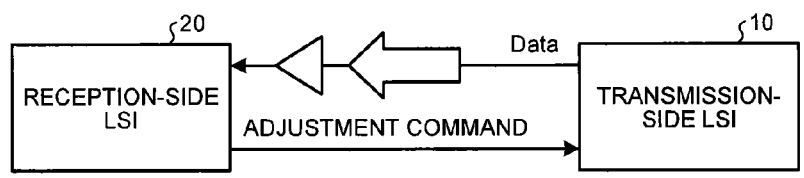
FIG. 25 is a diagram illustrating exemplary transmission end waveforms during impedance adjustment.
Figure 26:
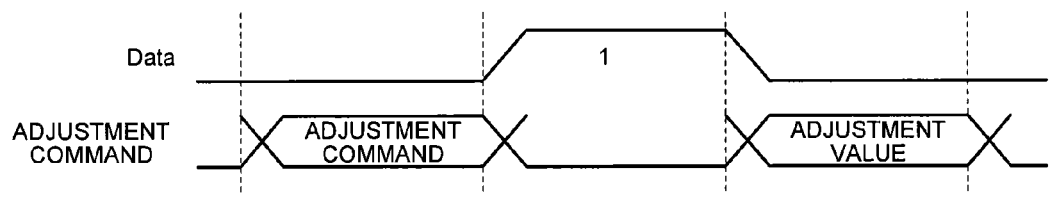
FIG. 26 is a diagram for explaining impedance adjustment.

As illustrated in FIG. 25, in order to adjust an impedance, the transmission-side LSI 10 transmits the adjustment data for impedance adjustment from the transmission-side LSI 10 to the reception end 22 in the reception-side LSI 20, thereby to adjust a reception timing or impedance. The adjustment data is transmitted to the reception-side LSI via a transmission line to be adjusted. The reception-side LSI 20 measures a state of the received adjustment data, and transmits an adjustment command indicating the measurement result to the transmission-side LSI 10. As illustrated in FIG. 26, the reception-side LSI 20 issues an adjustment command indicating the measurement result, the transmission-side LSI 10 receives the adjustment command from the reception-side LSI 20 and sets the adjustment command in the transmission-side LSI, and the transmission-side LSI outputs data "1." The reception-side LSI 20 measures an impedance and returns an impedance adjustment value to the transmission-side LSI 10, thereby to adjust the impedance of the transmission-side LSI 10.

The reception data extraction unit 26 eliminates the adjustment data from the received data, and extracts the reception data. Then, the reception data extraction unit 26 notifies the normal data to the reception data use unit 27. The reception data use unit 27 receives the reception data from the reception data extraction unit 26 and uses the reception data.

[Processing of Data Transmission System]

Figure 27:
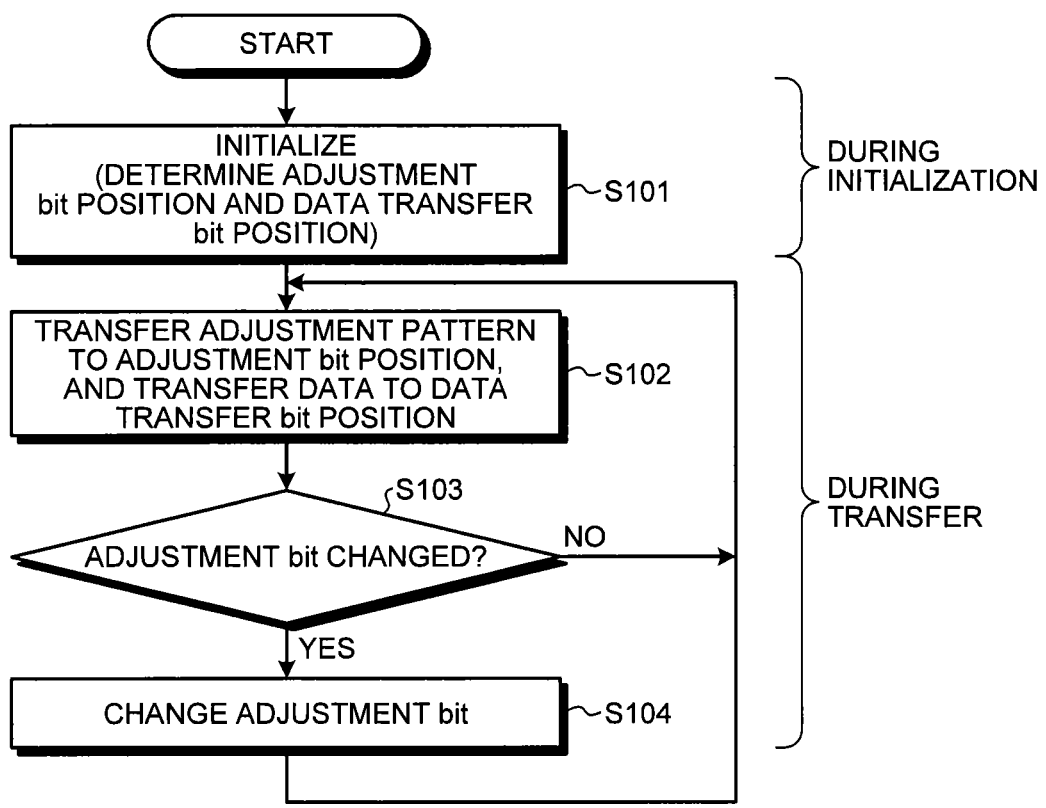
FIG. 27 is a flowchart illustrating processing operations of the data transmission system according to the first embodiment.

The processing of the data transmission system 1 according to the first embodiment will be described below with reference to FIG. 27. FIG. 27 is a flowchart illustrating the processing operations of the data transmission system according to the first embodiment.

As illustrated in FIG. 27, when data transfer is started when the device power supply is powered on, the data transmission system 1 performs initialization between the transmission-side LSI 10 and the reception-side LSI 20 (step S101). For the initialization processing, an adjustment bit position and a data transfer bit position are determined. The transmission-side LSI transfers an adjustment pattern to the adjustment bit position, transfers transfer data to the data transfer bit position (step S102), and transfers the data while performing the adjustment operation.

Thereafter, the reception-side LSI 20 determines whether the adjustment bit position needs to be changed according to predetermined conditions (step S103). For example, when an error occurs in a transmission path, the reception-side LSI 20 determines that the adjustment bit position needs to be changed. Consequently, when the reception-side LSI 20 determines that the adjustment bit position does not need to be changed (No in step S103), the processing returns to step S102, where the transmission-side LSI 10 keeps on transferring the adjustment pattern and the transfer data (step S102).

When the reception-side LSI determines that the adjustment bit position needs to be changed (Yes in step S103), the change in adjustment bit position is notified from the reception-side LSI 20 to the transmission-side LSI 10 and the transmission-side LSI 10 changes the adjustment bit position (step S104). After the adjustment bit position is changed, the transmission-side LSI transfers the adjustment pattern to the changed adjustment bit position, and transfers the transfer data to the data transfer bit position (step S102). The reception-side LSI 20 uses the position-changed adjustment bit to make an adjustment.

[Effects of First Embodiment]

As described above, the data transmission system 1 includes a plurality of signal lines 16A to 16E. The data transmission system 1 determines which signal line among the signal lines 16A to 16E is used to transmit the reception adjustment data. The data transmission system 1 uses the determined signal line to transmit the reception adjustment data to the reception-side LSI 20, and uses another signal line to transmit the transmission data to the reception-side LSI 20. Thus, a phase adjustment pattern transmission processing can be performed in parallel with the normal data transmission processing, thereby enhancing a data transmission efficiency while making a reception adjustment.

According to the first embodiment, when being notified, from the reception-side device, that an error is occurring in a transmission line, the data transmission system 1 determines to transmit the reception adjustment data to the reception-side device by use of the transmission line. Thus, the transmission path where an error occurs can be subjected to reception adjustment, thereby receiving the data in a proper state.

According to the first embodiment, the data transmission system 1 switches the transmission line that transmits the reception adjustment data whenever a predetermined period elapses. Thus, all the transmission paths can be subjected to reception adjustment, thereby enhancing a data transmission efficiency.

According to the first embodiment, the data transmission system 1 transmits the data that adjusts a reception timing as the reception adjustment data, thereby properly adjusting the reception timing.

According to the first embodiment, the data transmission system 1 transmits the data that adjusts an impedance as the reception adjustment data, thereby properly adjusting the impedance.

Second Embodiment

The first embodiment has been described above, but various different forms other than the above embodiment may be made. A second embodiment as other embodiment will be described below.

(1) Multiple Transmission-Side LSIs

Figure 28:
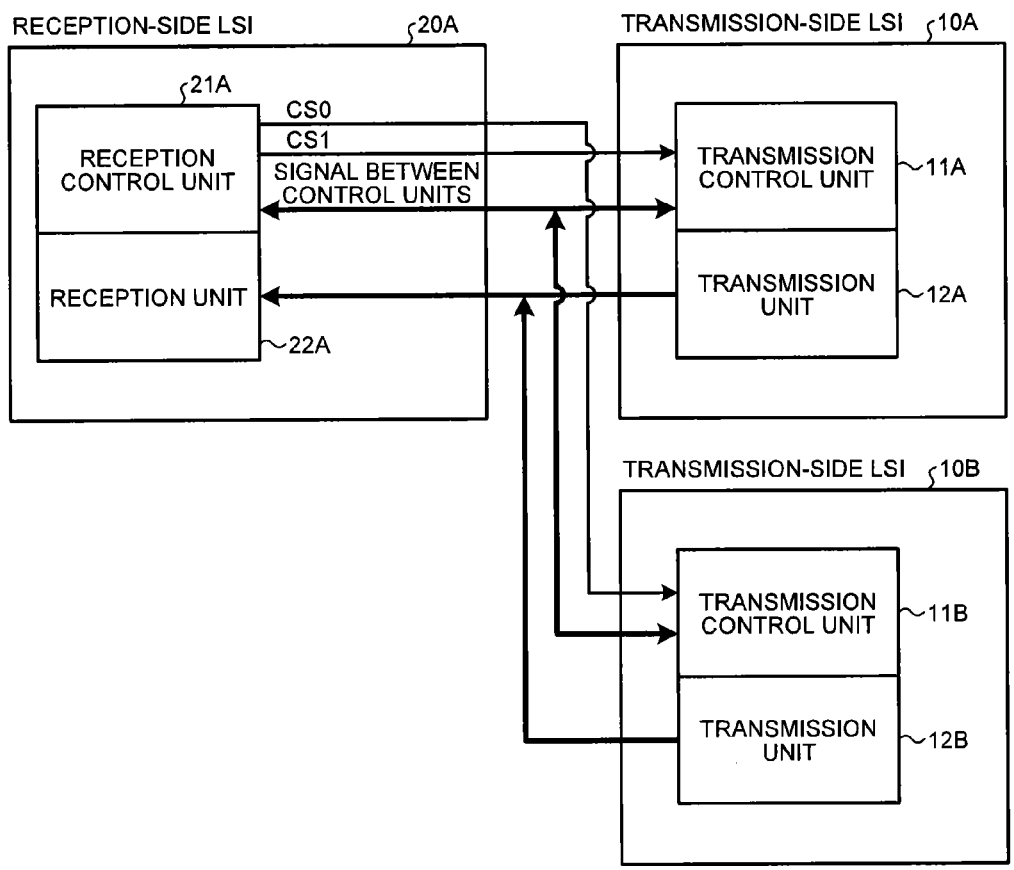
FIG. 28 is a diagram for explaining an example in which a plurality of transmission units are present.

There has been described in the first embodiment the case in which data is transmitted between a transmission-side LSI and a reception-side LSI, but the present invention is not limited thereto and a plurality of transmission-side LSIs may be employed. For example, as illustrated in FIG. 28, a plurality of transmission-side LSIs for data transmission are present, the reception-side LSI uses CS1 for output to a transmission-side LSI 10A to communicate signals between the control units, and uses CS0 for output to a transmission-side LSI 10B to communicate signals between the control units. The detailed structure of the respective units is described in FIG. 1 and will be omitted.

When rapid data reception is performed between the transmission-side LSIs and the reception-side LSI, a distance between the transmission-side LSI 10A and a reception-side LSI 20A arranged on each substrate is different from a distance between the transmission-side LSI 10B and the reception-side LSI 20A, and thus the reception-side LSI 20A stores two reception timings in association with each transmission-side LSI. The reception-side LSI 20 determines whether the data transmission source is the transmission-side LSI 10A or the transmission-side LSI 10B, and reads the reception timing for which the data transmission source corresponds to the transmission-side LSI 10A or the transmission-side LSI 10B, and switches to the read reception timing.

Then, the reception-side LSI 20 performs the phase adjustment pattern transmission processing at the same time with the normal data transmission processing by use of a plurality of transmission paths while switching a reception timing depending on whether the data transmission source is the transmission-side LSI 10A or the transmission-side LSI 10B.

In this way, also when a plurality of transmission-side LSIs are present, the phase adjustment pattern transmission processing can be performed in parallel with the normal data transmission processing, and consequently thereby enhancing a data transmission efficiency while making a reception adjustment.

(2) Common Signal

Figure 29:
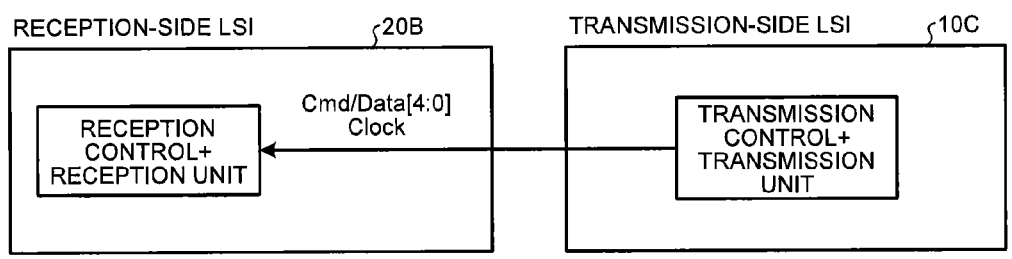
FIG. 29 is a diagram for explaining an example in which a command and data make a common signal.

The present invention may employ a common signal that puts a command to be communicated and data into one item of information between the transmission-side LSI for data transmission and the reception-side LSI for data reception. For example, as illustrated in FIG. 29, a transmission-side LSI 10C includes a transmission control+transmission unit in which the functions of the transmission control unit and the transmission unit are integrated, and a reception-side LSI 20B includes a reception control+reception unit in which the functions of the reception control unit and the reception unit are integrated. Then, the transmission control+transmission unit transmits a bit assignment command carried on "Cmd/Data [4:0]" as a common signal to the reception control+reception unit in parallel. In the example of FIG. 29 the transmission side and the reception side are one-way, and thus timing adjustment completion information on the reception side is not transmitted to the transmission side.

Specifically, the transmission control+transmission unit transmits a command of designating an adjustment bit position for initial timing adjustment to the reception control+reception unit for initialization. Then, the reception control+reception unit receives the adjustment pattern and makes a timing adjustment. At this time, the transmission side and the reception side are one-way, and thus timing adjustment completion information on the reception side is not transmitted to the transmission side.

Figure 30:
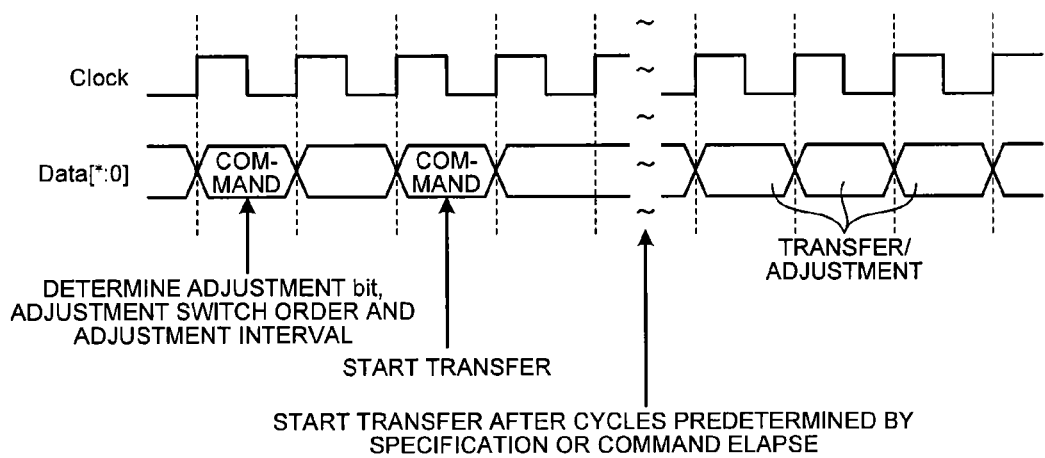
FIG. 30 is a diagram illustrating adjustment bit determination and transfer start waveforms during initialization.

As illustrated in FIG. 30, the transmission control+transmission unit transmits, to the reception control+reception unit, to which bit in the data bits the data is transferred and to which bit in the data bits the adjustment pattern is assigned (described as adjustment bit in FIG. 30). The reception control+reception unit controls to switch the data bit and the adjustment bit and to receive the data. At this time, the transmission control+transmission unit completes setting an adjustment bit switch order and an adjustment interval as an adjustment bit switch interval, and then starts to transfer the data in a transfer start command.

Figure 31:
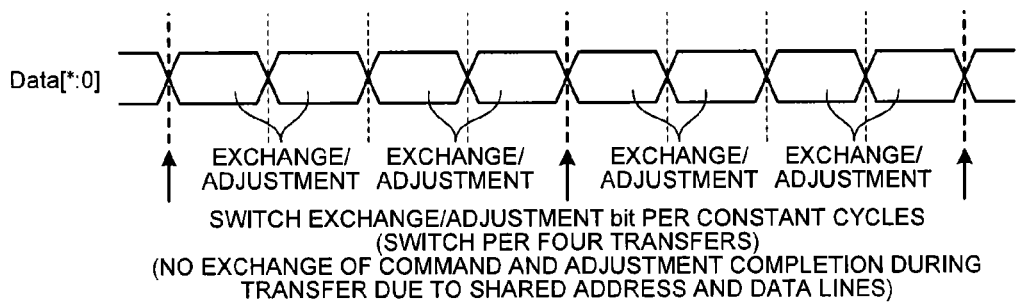
FIG. 31 is a diagram for explaining adjustment bit change waveforms per data transfer amount.
Figure 32:
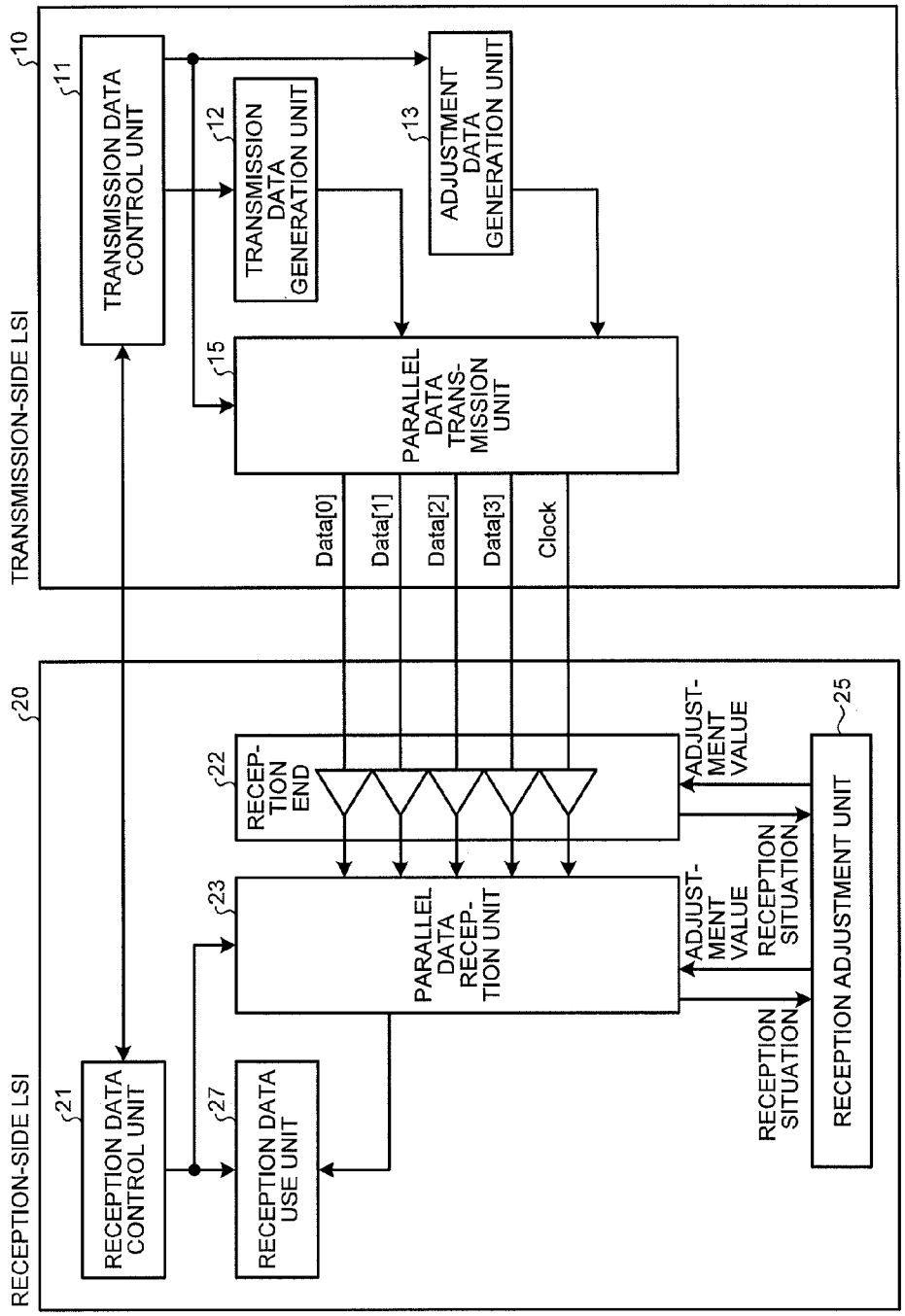
FIG. 32 is a block diagram illustrating a structure of a conventional transmission system.
Figure 33:
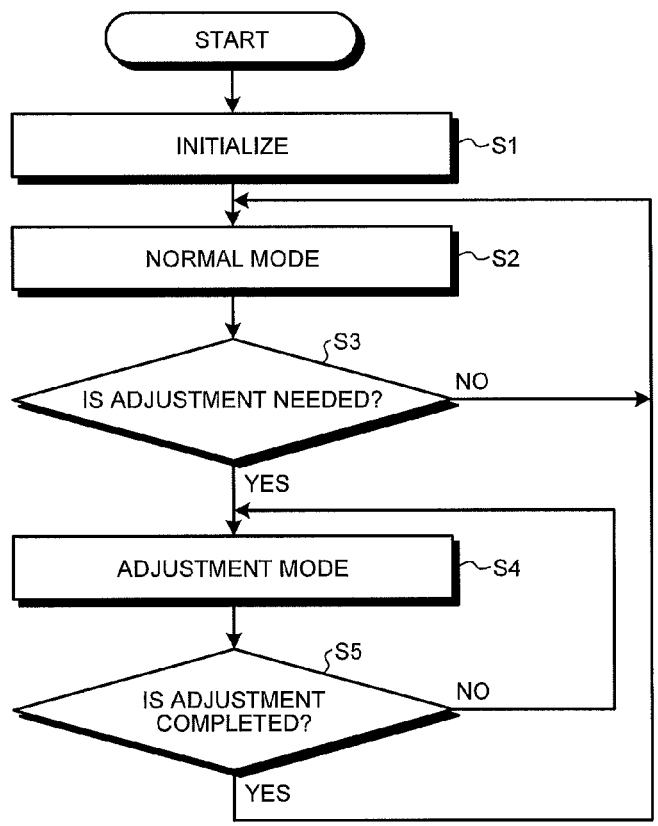
FIG. 33 is a flowchart for explaining a processing procedure of the conventional transmission system
Figure 34:
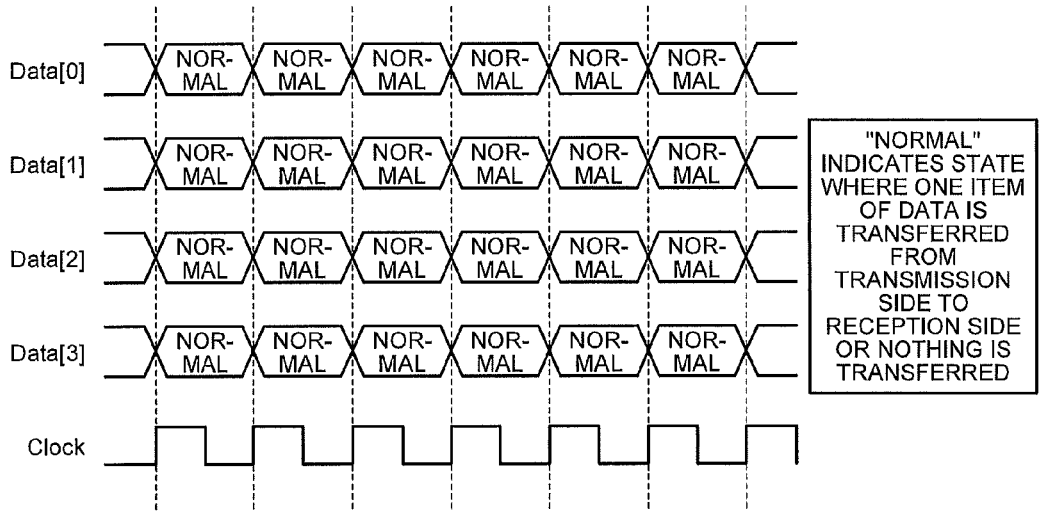
FIG. 34 is a diagram illustrating exemplary parallel data transmission/reception waveforms in a normal mode.
Figure 35:
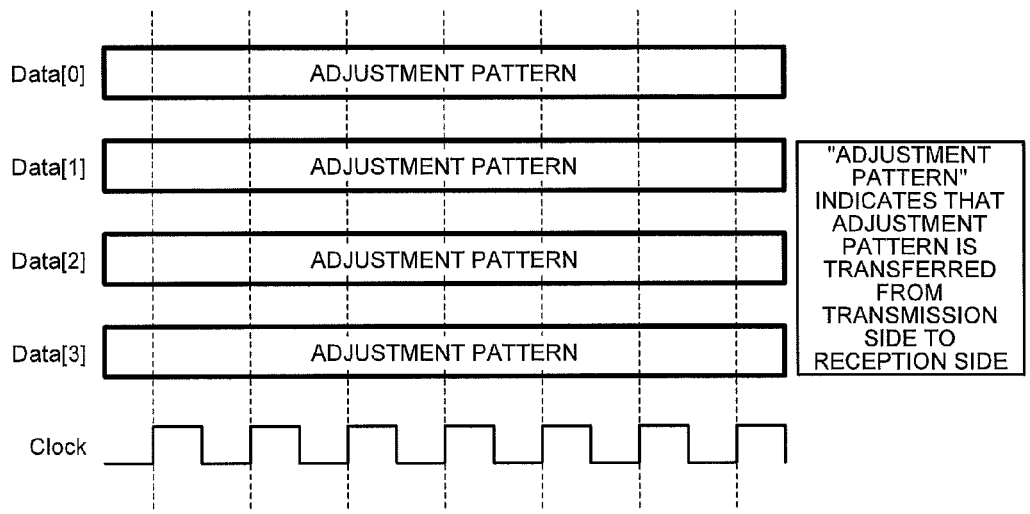
FIG. 35 is a diagram for explaining adjustment pattern transmission/reception.
Figure 36:
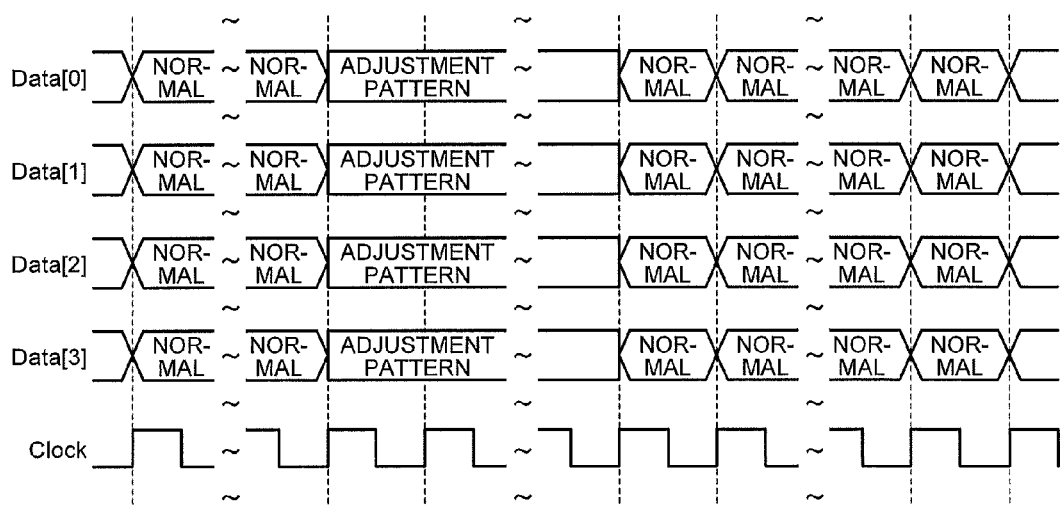
FIG. 36 is a diagram for explaining how to switch the normal mode and reception adjustment.

The transmission-side LSI 10C and the reception-side LSI 20B perform the data transfer and the reception adjustment at the same time. Thereafter, the transmission control+transmission unit switches the data bit and the adjustment bit per predetermined transfers between the transmission-side LSI 10C and the reception-side LSI 20B as illustrated in FIG. 31. The reception side also switches the data bit and the adjustment bit per predetermined transfers.

In this way, even when the command and the data make a common signal, the phase adjustment pattern transmission processing can be performed at the same time with the normal data transmission processing, thereby enhancing a data transmission efficiency while making a reception adjustment.

(3) System Configuration and Others

Each component in each illustrated device does not necessarily need to be physically configured as illustrated. That is, specific forms of distribution and integration of the respective devices are not limited to illustrated ones, and all or part of them may be functionally or physically distributed or integrated in an arbitrary unit according to various loads or use situation. For example, the transmission data control unit 11 and the parallel data transmission unit 15 may be integrated. Further, all or any of each processing function performed in each device may be realized in a CPU or a program analyzed and executed in the CPU, or may be realized as wired logic hardware.

(4) Programs

The data transmission method described in the present embodiment may be realized by executing previously-prepared programs in a computer such as personal computer or workstation. The programs may be distributed via a network such as Internet. The programs may be recorded in a computer readable recording medium such as hard disk, flexible disk (FD), CD-ROM, MO or DVD, and may be read from the recording medium by the computer for execution.

One aspect of the data transmission system disclosed in the present application obtains an effect of enhancing a data transmission efficiency while making a reception adjustment.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data transmission system comprising:
    a plurality of signal lines that transmit data transmitted from a transmission-side device to a reception-side device;
    a signal line determination unit that determines which signal line among the signal lines is used to transmit reception adjustment data to the reception-side device; and
    a data transmission unit that uses the signal line determined by the signal line determination unit to transmit the reception adjustment data to the reception-side device and uses another signal line to transmit transmission data to the reception-side device, wherein
    the reception-side device, when an adjustment bit is changed at an interruption of data transfer, makes a request for the adjustment bit and notifies, the signal line determination unit, of a bit which is desired to be assigned to the adjustment bit due to many errors together with adjustment completion "1" as a status indicating that the adjustment of the adjustment bit has been completed, and
    the signal line determination unit holds states of a transfer bit and the adjustment bit until the data transfer completes once, and after the data transfer is completed, transmits, to a reception data control unit, a switch command of instructing to switch assignments of the transfer bit and the adjustment bit, transmits, to the reception data control unit, a transmission command, switches the transfer bit and the adjustment bit, and restarts the data transmission after command-enabled cycles elapse since the transmission command is input.

2. The data transmission system according to claim 1, wherein when being notified of the fact that an error is occurring in a signal line from the reception-side device, the signal line determination unit determines to transmit reception adjustment data to the reception-side device using the signal line where the error occurs.

3. The data transmission system according to claim 1, wherein the signal line determination unit switches a signal line that transmits the reception adjustment data per predetermined cycle.

4. The data transmission system according to claim 1, wherein the data transmission unit transmits data that adjusts a reception timing as the reception adjustment data.

5. The data transmission system according to claim 1, wherein the data transmission unit transmits data that adjusts an impedance as the reception adjustment data.

6. The data transmission system according to claim 1, wherein the signal line determination unit, when determining a data transfer bit position indicating a transmission path that transmits data and an adjustment bit position indicating a transmission path that transmits adjustment data, transmits an instruction of starting data transfer to a reception data control unit in the reception-side device, when receiving a response that the instruction of starting transfer has been received from the reception data control unit, notifies the adjustment bit position to the reception data control unit, and receives a response that the adjustment bit position has been received from the reception data control unit.

7. The data transmission system according to claim 1, wherein the signal line determination unit switches a transmission path that transmits an adjustment pattern to a reception data control unit in the reception-side device according to predetermined conditions and assigns the adjustment pattern to a data transmission path which is not adjusted until a predetermined period of time elapses after adjustment.

8. A data transmission method comprising:
    determining which signal line among a plurality of signal lines is used to transmit reception adjustment data for reception adjustment to a reception-side device; and
    using the signal line determined at the determining to transmit reception adjustment data to the reception-side device and using another signal line to transmit transmission data to the reception-side device, wherein
    the reception-side device, when an adjustment bit is changed at an interruption of data transfer, makes a request for the adjustment bit and notifies, a signal line determination unit, of a bit which is desired to be assigned to the adjustment bit due to many errors together with adjustment completion "1" as a status indicating that the adjustment of the adjustment bit has been completed, and
    the determining includes holding states of a transfer bit and the adjustment bit until the data transfer completes once, and after the data transfer is completed, transmits, to a reception data control unit, a switch command of instructing to switch assignments of the transfer bit and the adjustment bit, transmits, to the reception data control unit, a transmission command, switches the transfer bit and the adjustment bit, and restarts the data transmission after command-enabled cycles elapse since the transmission command is input.

9. A transmission device that is connected to a reception-side device via a plurality of signal lines and transmits parallel data to the reception-side device via the signal lines, the transmission device comprising:
    a signal line determination unit that selects a signal line that transmits reception adjustment data so as to make a reception adjustment in the other device from the signal lines, wherein the reception adjustment data is transmitted to the other device via the signal line selected by the signal line determination unit and parallel data is transmitted to the other device via another signal line, wherein the reception-side device, when an adjustment bit is changed at an interruption of data transfer, makes a request for the adjustment bit and notifies, the signal line determination unit, of a bit which is desired to be assigned to the adjustment bit due to many errors together with adjustment completion "1" as a status indicating that the adjustment of the adjustment bit has been completed, and the signal line determination unit holds states of a transfer bit and the adjustment bit until the data transfer completes once, and after the data transfer is completed, transmits, to a reception data control unit, a switch command of instructing to switch assignments of the transfer bit and the adjustment bit, transmits, to the reception data control unit, a transmission command, switches the transfer bit and the adjustment bit, and restarts the data transmission after command-enabled cycles elapse since the transmission command is input.

* * * * *